United States Patent [19]

Card

[11] Patent Number: 4,643,981

[45] Date of Patent: Feb. 17, 1987

[54] PRESSURE FILTRATION SYSTEM

[75] Inventor: Benjamin D. Card, Arlington, Tex.

[73] Assignee: Akzo N.V., Arnhem, Netherlands

[21] Appl. No.: 550,170

[22] Filed: Nov. 9, 1983

[51] Int. Cl.$^4$ .............................................. B01D 25/02
[52] U.S. Cl. .................................... 436/500; 210/780; 210/359
[58] Field of Search ............... 210/359, 516, 517, 518, 210/927, DIG. 24, 780, 781, 782, 789, 490, 506, 509, 510.1; 422/101, 69, 71; 436/500

[56] References Cited

U.S. PATENT DOCUMENTS

| 3,543,940 | 12/1970 | Schmidt | 210/490 |
| 3,799,342 | 3/1974 | Greenspan | 210/780 |
| 3,802,843 | 4/1974 | Kim | 422/71 |
| 3,814,258 | 6/1974 | Ayres | 210/359 |
| 3,870,639 | 3/1975 | Moore et al. | 210/927 |
| 4,254,082 | 3/1981 | Schick et al. | 422/55 |
| 4,324,574 | 4/1982 | Fagan | 55/487 |
| 4,369,117 | 1/1983 | White | 210/927 |
| 4,426,295 | 1/1984 | Evans et al. | 210/927 |

FOREIGN PATENT DOCUMENTS 519595 4/1940 United Kingdom ............... 210/359

Primary Examiner—Ivars Cintins
Attorney, Agent, or Firm—Abelman, Frayne, Rezac & Schwab

[57] ABSTRACT

A method and apparatus for separation and filtration of particulate matter of sediment from a liquid sample. The system includes a unitary filter assembly having an intermediate fibrous filter material disposed between two layers of porous, relatively rigid plastic material. The unitary filter assembly is pressed axially toward the closed end of a sample container, such as a test tube, resulting in an upward flow of filtrate with compaction and retention of the particulates between the unitary filter assembly and the closed end of the sample container. The filter assembly is free of orientation criticality and may be readily adapted to automated handling in multiple tests or assays.

15 Claims, 5 Drawing Figures

PRESSURE FILTRATION SYSTEM

BACKGROUND OF THE INVENTION

The invention relates to a method and apparatus for the pressure filtration and separation of liquids which contain precipitates, sediment, or other particulate solids. The invention is particularly useful with diagnostic procedures which have heretofore conventionally relied on the necessary use of a centrifugation step, to separate particles from liquid samples being tested, and which is now obviated by the instant invention which uniquely utilizes an in-container pressure filtration system having a three-component filter assembly.

While immunoassay techniques as widely practiced under various protocols are an especially beneficial area of use of the invention, other tests, assays, and filter and separation procedures and techniques requiring centrifugation can benefit from the instant invention.

One such technique is disclosed in U.S. Pat. No. 3,666,854 to Anna Eisentraut. This patent discloses a diagnostic test for the determination of the level of thyroid hormone within a body fluid.

The test includes the steps of adding a radioisotyope labeled hormone to a solution containing a sample of hormone produced within the body and thyro-binding globulin containing bound hormone from the resulting unbound hormone, and counting the radioactivity of either the bound or unbound hormone. This counting procedure will indirectly indicate the amount of endogenous hormone which is bound to the natural globulin and protein bonding sites within the blood. The separation of the free hormones from hormones bound to natural binding sites is carried out by sorption of the free hormones by particulate inorganic crystalline lattice material which is preferably in colloidal form. Once sorption is complete, the material is centrifuged to separate the colloid from the resulting solution, for example, at 2,400 rpm for 5 minutes. The colloidal material is then packed in the bottom of the tube and counted on a scintillation well counter to determine the amount of hormone present.

Various in-tube filter-type separation devices are taught in earlier patents, and to which reference may be had to illustrate avenues of development which differ from that of the present invention.

Thus, U.S. Pat. No. 3,693,804 to Grover discloses a pressure differential sampling apparatus utilizing an elongate hollow piston member having a central axial bore and a flexible peripheral lip which engages the inside wall of the test tube, allowing pressure to be formed in the sample space, and wherein the filtrate is received through a single-element filter and retained within the interior of the elongate piston member.

U.S. Pat. No. 4,189,385 to Greenspan is directed to a method and apparatus for separating serum or plasma from the heavier formed elements of the blood wherein a collection tube is filled with a previously centrifuged sample, and a separator tube having a valving plug is then inserted down through the sample which passes through the valve plug into the separator tube for collection.

U.S. Pat. No. 4,254,082 to Schick teaches a method for determining a specific binding substance in an assay test, and provides an absorbent, such as ion-exchange materials, cellulose, silica gel and other materials capable of nonspecific binding with the substance to be determined, retained between two porous discs wherein the absorbent is contacted with the test sample, separated from the unabsorbed portions of the sample, contacted with the labeled binding partner, then measured for radioactivity.

SUMMARY OF THE INVENTION

The present invention is directed to a method and means for the filtration and the separation of particulate matter as binders or sediment from liquid samples, as in radioimmunoassay (RIA) analysis. The apparatus includes a unitary filter assembly including a disc-shaped layer of fibrous filter material having a pore size appropriate to restrict the flow of undesired particulates through the filter, but permitting flow of the liquid solution through the pores of the fibrous material. The fibrous filter material is sandwiched between two layers of porous plastic material, such as polyolefin, having a pore size that is at least equal to that of the fibrous filter material.

The three-layer disc-shaped filter forms a unitary assembly and is of a size such that when placed inside the mouth of an elongate sample container, illustratively a test tube, or microtitre plate, the edge of the disc, when pressed to the bottom of the sample container by means of a plunger or aspirator, presses the particulate matter toward the bottom, wiping the particulates from the container sides, and creates its own seal, thereby retaining the particulate material at the bottom of the container as the liquid matter passes upwardly through the disc assembly for separated collection thereabove.

Accordingly, the present invention provides a means for a ready and simplified filtration and separation of a liquid sample and a method of use thereof which avoids the essential need for a centrifugation step.

The present invention also provides a means for the filtration and separation of a liquid sample which is simple to use and avoids the undesirable crumbling of the filter element under pressure and the resultant waste of the sample associated therewith, which assembly may be readily adapted to mechanized or automated multiple tube tests or assays.

DESCRIPTION OF THE PREFERRED EMBODIMENTS

Figure 1:
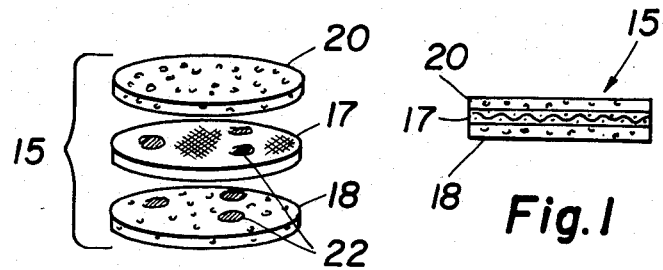
FIG. 1 is an enlarged side sectional elevation illustrating the three-disc filter assembly.

The unitary filter assembly 15 as shown in FIG. 1 uniquely includes three cooperatively associated components. An intermediate layer 17 comprises a fibrous filter material. The fibrous filter material is of a pore size to permit upward pressure flow of the filtrate as the unitary filter assembly is urged toward the closed end 12 of the sample container, while preventing the sediment, or particulate material from flowing upwardly therethrough, thereby to trap and compact the solid matters toward the bottom. The specific fibrous filter material may be varied depending on pore size and as necessary for the particular sample being separated. The filter material may be selected from a wide variety of materials provided they are capable of maintaining their pore size after being encased between the two outer discs. Illustrative useable materials include glass-wool, glass fibers, asbestos, synthetic plastic fibers or other organic or inorganic filtering material.

As the filter element 17 itself is insufficiently rigid to withstand axial pressure thereon both by the plunger 16 and the solid material during pressure filtration movement without flexing or crumbling, the filter assembly 15 further includes porous plastic layers 18 and 20 of similar lateral dimensions disposed on either side of fibrous filter layer 17 wherein the porous layers are inert to the sample material under test. Porous layers 18 and 20 have sufficient rigidity to provide support to the intermediate filter layer to prevent crumbling or tearing thereof resulting from downward pressure thereon and the resultant upward flow of the filtrate. At the same time, the porous layers 18, 20 are porous, having interconnected voids defining passageways or channels through the material, which channels or pores of sufficient size as to permit the flow of the filtrate from the bottom of the container upwardly through the first plastic layer, through the fibrous filter material 17 and through the second plastic layer, while restricting the particulates to the closed end of the container.

The porous layers may be selected from a wide variety of natural or synthetic polymeric materials which are water insoluble. Illustrative materials include polyethylene, polyvinylpropylene, polystyrene, polypropylene, cellulose, glass fibers, nylon, teflon, fluoroteflon and mixtures thereof. The molecular weight of these materials is not critical to the invention provided the materials maintain the described physical properties.

Figure 2:
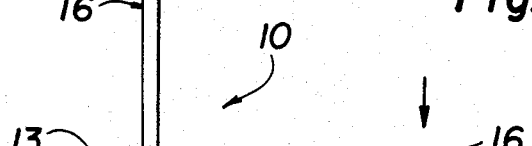
FIG. 2 is an exploded perspective view of the filter assembly showing the fibrous filter material sandwiched between two porous support members.

The layer of fibrous filter material 17 is thus disposed between the porous, somewhat rigid, plastic material components 18, 20. This structure is preferably adhered together to form a unitary assembly 15. Any suitable means may be used, such as spot printing of a non-reactive adhesive material, as illustrated in FIG. 2 at 22. Other means include the use of a non-reactive adhesive applied around the periphery of the adjacent layers of the unitary filter structure, as well as needle impregnation thereinto and other physical means of binding the layers together, or any bonding means which do not interfere with the flow of the filtrate and which is inert to the materials of the sample.

Figures 3, 4, 5:
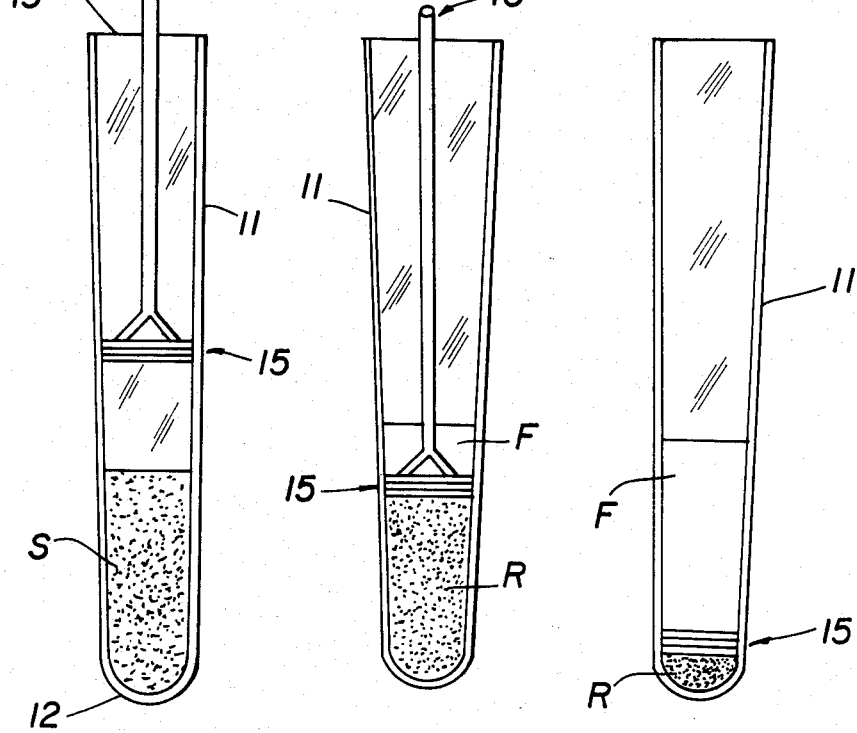
FIG. 3 is a sectional view of a preferred embodiment of the invention illustrating a sample container partially filled with a liquid sample, filter assembly and plunger.
FIG. 4 is similar to FIG. 3 wherein the filter assembly has been urged downwardly through the liquid sample by the plunger.
FIG. 5 is a further similar view of the sample container after the filter device has been pushed downwardly through the liquid sample, having compressed the precipitate or undissolved solids to the bottom of the sample container.

As seen on FIG. 3, there is provided an exemplary means, namely a unit 10 for pressure filtration and separation of a liquid sample, comprising a sample container 11 having a closed end 12 and an open end 13.

The sample container 11 may be a test tube, the inner walls of which are preferably slightly internally tapered to converge toward closed end 12, but which tube may also be of uniform internal bore dimensions. As seen in FIG. 3, the filter and support assembly 15 of the invention is inserted into the container in axial alignment with the bore of the container, and is dimensioned such that the outer edge of the unitary filter-support assembly 15 engages the inner wall of the container to wipe the inside thereof as the assembly 15 is axially urged to the bottom of the tube, as by means of a plunger member 16 having a lower head portion engaging the filter-support assembly 15. The unitary filter assembly may also be forced to the bottom of the container by suitable aspiration means creating a vacuum to induce filtration and movement of the filter.

From the foregoing description, the method of utilizing the disclosed preferred system is apparent. An aliquot of sample liquid S is placed into container 11. Unitary filter assembly 15 is inserted into the container in axial alignment with the bore of sample container 11, and has a diameter such that the circumferential surface of the filter assembly engages the inner wall of the container. Plunger 16 is placed with its distal head against the surface of the unitary filter assembly, and manual or mechanical pressure is exerted against the plunger, thereby downwardly pressing the filter apparatus toward and through the liquid sample S. The filter simultaneously wipes the sample and any particulate matter associated therewith from the inner wall of the container, as in FIG. 4. In this regard, it is observed that while the support discs 18, 20 are relatively rigid, thereby to reliably accept manual or automatic plunger pressure, the polymeric material, from which they are made is sufficiently flexible to provide and enhance the desired wiping seal with the receptable walls.

Accordingly, the sample filtrate liquid F passes upwardly through the first porous plastic support layer 20, through the pores of the filter paper 17, and lastly through the second porous plastic layer 18. Any residue sediment or particulate matter R of a size larger than the pore size of any of the layers of the filter device is retained and relatively compacted between the filter assembly 15 and the bottom surface of the test tube, as in FIG. 5.

The filtrate may be collected from the sample container 12 for its intended use, including for further examination and testing such as by removal with a pipette, decantation, aspiration or other suitable method. Simple decanting may readily be employed to remove the filtrate, as the engagement between the unitary filter device and the inner wall of the sample container provides a seal and serves to retain the sediment or particulate at the bottom of the container in the appropriate environment. As with RIA or other diagnostic tests the remaining sediment or particulate material R may be itself subsequently tested or examined without removal from the container.

As used herein the term sediment or particulate material may be any solid material which is separated from its filtrate. Such materials include inorganic sorbant materials such as talc and charcoal as well as glass beads which contain analytes for reacting with sample ligands, that is bound antibody, antigen or hapten for reaction with sample conjugate materials. The solid material may also be organic in nature such as sepharose, microcrystalline cellulose, macroaggregated albumin and so forth.

The filtration and separation method and apparatus of the instant invention is particularly useful in connection with diagnostic tests that have heretofore required a physical separation of solid material from a liquid sample, such as by decantation when using glass beads or centrifugation with test tube samples containing particulates. The use of conventional aspiration means to aid in filtration are also contemplated for use herein.

Illustratively, T3 uptake tests are for the purpose of assessing the unsaturated binding capacity of specific serum proteins, primarily thyroxine-binding globulin (TBG) to determine the level of thyroxine in a patient. The assessment is accomplished by the addition of an excess of $^{125}$I-labeled liothyronine (also known as L-triiodothyronine or T3) to saturate all available TBG binding sites in the sample of serum. For example, if the endogenous thryoxine level is high, as in hyperthyroidism, the TBG in the patient's sample is relatively saturated, and more $^{125}$I-labeled T3 remains in a free state to be absorbed by a secondary binder, such as inorganic silicates. When thyroxine output is low, the labeled T3 will bind to the available TBG sites, yielding a low percentage of radioactivity to be absorbed by the secondary binder.

The T3 uptake test may be performed by mixing radioisotopically labeled T3. Unbound $^{125}$I-T3 is removed from the solution by the addition of a second binder, preferably a dispersible inorganic silicate tablet. After dispersion of the silicate tablet, and mixing of the solution, the samples conventionally are allowed to stand for approximately 5 minutes and are then centrifuged for 5 minutes at 1000-3000 rpm. The supernatant fluid is then drained and discarded; the remaining sediment, principally comprising the excess labeled T3 bound to the silicate may then be measured for radioactivity, thus permitting determination of the level of excess T3 and ultimately, the level of thyroxine in the sample serum.

The filtration and separation apparatus and method of the instant inventon eliminates the need for the 5-minute centrifugation step presently employed in such test procedures. After the incubation period subsequent to the addition and dispersion of the silicate tablet, the unitary filter assembly is placed in the sample container, and plunged through the sample as described. The supernatant liquid would be simply removed by decantation or aspiration. Without removing the filter assembly 15, the sample container would be placed directly in the gamma scintillation well counter for determination of the radioactivity of the particulate matter.

Illustrative of such a unitary filter assembly 15 useful in connection with the aforementioned T3 technique to obviate the need for the centrifugation step is a filter assembly having an intermediate layer 17 of glass fibers of pore size less than $10^{-7}$ to $10^{-1}$ centimeters sandwiched between two layers 18, 20 of at least similar pore size support discs wherein the total thickness of the unitary filter assembly is about 1/16 of an inch.

The elimination of the centrifugation step offers the savings of time, as well as the elimination of the labor involved in loading and unloading the centrifuge, along with the incumbent risks of operator error.

Additionally, the use of the instant pressure filtration assembly system especially by virtue of the 3-layer filter/support lends itself to automation, as the application of a number of appropriately dimensioned filter assemblies 15 to a corresponding set of tube samples may be easily accomplished in a mechanized handling system for dispensing the filters seriatim, for example. The structure of the unitary filter assembly, specifically the fibrous filter material 17 sandwiched between two support layers 18, 20 of porous plastic, is such that its performance as a filter is not affected by it orientation. Either porous plastic layer 18 or 20 may be placed adjacent the sample fluid so that as the filter structure is urged through the sample S, the sample may pass through plastic layer 20, fibrous filter layer 17 and subsequently plastic layer 18 or vice versa, through layer 18, fibrous filter layer 17 and then through layer 20 depending on the orientation of the unitary filter assembly.

The ease with which such unitary filter assemblies may be applied to the sample either singly or to multiple samples may be appreciated, as the structure precludes the need for determination of specific orientation, requiring only visually or mechanically insuring the axial alignment of the filter assembly with the bore of the specimen container.

Although a specific embodiment of the invention has been shown and described, it will be understood that other embodiments and modifications may be utilized without departing from the true spirit and scope of the invention as set forth in the appended claims. By way of illustration, for example, the unique filter assembly 15 may be employed in connection with the equipment shown in the prior art as discussed above. Other uses and environments of the invention will occur to those skilled in the art.

What is claimed is:

1. A method of filtration for immunoassay purposes comprising the steps of:
    providing a receptacle having an open end and a closed end,
    placing a quantity of filterable liquid material into the receptacle,
    inserting a unitary filter assembly comprising a first and second support disc of porous, relatively rigid material into the receptacle, with said disc closely fitting the inside wall of the receptacle; and a fibrous filter material having a predetermined pore size disposed between said first support disc, and said second support disc;
    moving said filter assembly toward and through the liquid in said receptacle thereby to cause said liquid and components thereof of a size less than said pore size to pass through said discs to provide a filtrate at a location thereabove while components of size greater than pore size are compacted toward the closed end of the receptacle, wherein the pore size of the first and second support discs is at least equal to the pore size of the fibrous filter material.

2. The method of claim 1 wherein said filter and support discs are attached by a bond together to form a unitary assembly and wherein the fibrous filter material has a pore size less than $10^{-7}$ to $10^{-1}$ centimeters.

3. The method of claim 2 wherein the receptacle is a test tube having an inner bore whose walls taper in a converging direction toward the closed end, and including the step of wiping the walls of said tube by said discs as the same are moved through the liquid.

4. The method of claim 1 wherein the receptable is a test tube having a substantially cylindrical inner bore, and including the step of wiping the walls of said tube by said discs as the same are moved through the liquid.

5. The method of claim 1 including the step of performing a radioimmunoassay on the compacted material.

6. The method of claim 1 including the step of inserting a plunger means into said tube to engage the uppermost said support disc to effect said moving of said discs.

7. The method of claim 6 wherein said plunger means includes a first portion for manual engagement, a second portion being a footed portion having a circumference smaller than the axial bore of the sample receptacle whereby said footed portion may be placed against the uppermost support disc, and an elongated portion connecting said first manual engagement portion and second footed portion whereby force exerted downwardly against said first manual engagement portion is transmitted to said second footed portion against said uppermost support disc to plunge it and the underlying filter disc and second support disc downwardly through the sample liquid.

8. The method of claim 1 wherein said discs are of polyolefin material.

9. Apparatus for filtration and separation of particulate matter from a liquid comprising:
   a receptacle for receiving a liquid sample having an open end and a closed end,
   a unitary filter assembly comprising first support disc of porous, relatively rigid material, a second support disc of porous, relatively rigid material, a disc of fibrous filter material having a predetermined pore size disposed between the first and second support discs,
   means for urging said unitary filter assembly downward in the receptacle through the liquid sample towards the closed end of the receptacle, thereby to filter the liquid through the discs and compact the residue toward the closed end of the receptacle.

10. The apparatus of claim 9 wherein the support discs and fibrous filter disc are attached by a bond to form a unitary filter assembly and wherein the fibrous filter material has a pore size less than $10^{-7}$ to $10^{-1}$ centimeters.

11. The apparatus of claim 10 where the bonding is by means of a non-reactive adhesive material.

12. The apparatus of claim 10 where the bonding is by means of a needle impregnation.

13. The apparatus of claim 9 wherein the peripheries of said support discs are in wiping contact with the inner wall of said receptacle as the same are urged downwardly, thereby to urge all residue toward the receptacle closed end.

14. The apparatus of claim 13 wherein said receptacle has a substantially cylindrical inner wall.

15. The apparatus of claim 13 wherein said receptacle inner wall has a slight taper converging toward said closed end, thereby to enhance the seal with said support discs as the same are urged downwardly.

* * * * *